United States Patent [19]

Tynan

[11] Patent Number: 5,538,343

[45] Date of Patent: Jul. 23, 1996

[54] APPARATUS AND METHOD FOR LIQUID MIXING EMPLOYING NIP ZONES

[75] Inventor: Daniel G. Tynan, Wilmington, Del.

[73] Assignee: E. I. Du Pond de Nemours and Company, Wilmington, Del.

[21] Appl. No.: 399,283

[22] Filed: Mar. 6, 1995

[51] Int. Cl.[6] .................................................. B01F 7/12
[52] U.S. Cl. .......................... 366/305; 366/149; 366/302; 422/135; 425/381.2
[58] Field of Search ................................. 366/64, 66, 71, 366/74, 75, 176.1, 96–99, 139, 149, 302, 305, 306, 307, 342, 343; 425/381.2; 422/135, 136, 138, 225

[56] References Cited

U.S. PATENT DOCUMENTS

| | | |
|---|---|---|
| 3,279,893 | 10/1966 | Sikorski .................................. 422/135 |
| 3,342,124 | 9/1967 | Frykhult . |
| 3,484,213 | 12/1969 | Dew, Jr. et al. . |
| 3,634,042 | 1/1972 | McCown .............................. 422/135 X |
| 4,029,459 | 6/1977 | Schmiedeke . |
| 4,189,291 | 2/1980 | Longhi . |
| 4,886,368 | 12/1989 | King ..................................... 366/302 X |
| 5,205,647 | 4/1993 | Ricciardi ............................. 366/306 X |

*Primary Examiner*—Charles E. Cooley

[57] ABSTRACT

An apparatus for mixing or otherwise processing fluids, which apparatus comprises, within a housing, a rotating perforated drum positioned tangentially relative to an inner non-rotating stationary body that is located within the rotating perforated drum. The outer surface of the rotating perforated drum is also positioned tangentially relative to the inner surface of the housing or other outer non-rotating stationary body. In operation, zones are formed which promote mixing of the fluid being processed and generate new fluid surfaces, thereby facilitating mixing, degassing and/or reaction.

28 Claims, 3 Drawing Sheets

APPARATUS AND METHOD FOR LIQUID MIXING EMPLOYING NIP ZONES

FIELD OF THE INVENTION

This invention discloses an apparatus and method for mixing liquids and/or removing volatile substances from liquids. The apparatus, which may be employed as a mixer, processor, reactor, polymerizer, or finisher, renews fluid surfaces at high rates and provides improved mixing.

TECHNICAL BACKGROUND

U.S. Pat. No. 3,342,124 (Apparatus For Dewatering and Rinsing Hydrous Substances) discloses a squeezing apparatus comprising two corotating drums: an inner perforated rotary drum which rotates within a larger outer perforated rotary drum to form a single nip zone. Neither drum is heated, nor is a film formed of the hydrous material, preferably a fiber pulp suspension, being treated. In contrast, the present invention involves the combination of a rotating perforated drum in tangential relationship with at least two non-rotating stators or relatively stationary bodies, in various forms, in order to form at least two nip zones.

U.S. Pat. No. 3,484,213 (Polymer Handling and Conveying Apparatus) discloses a continuous polymerizer with a single rotating radially perforated annular cylinder that is eccentrically located within a heated housing to form a single nip zone. The apparatus serves to devolatilize a polymer melt by creating honeycombed films of great surface area to facilitate removal of gaseous reaction byproducts. In contrast with the present invention, a single perforated cylinder or drum is employed in association with only a single nip zone.

U.S. Pat. No. 4,029,459 (Method and apparatus for Manufacture of Granulates from Pulverulent, Granular, Doughy or Similar Material) discloses a method of forming granulates by means of a hollow perforated drum with a plurality of helical surfaced rollers, to form nip zones within the drum interior. In contrast to U.S. Pat. No. 4,029,459, however, the present invention, when operating with a single rotary perforated drum, forms nip zones on either side of the perforated drum such that the fluid being processed can move repeatedly inside and outside of the rotating perforated drum as it axially progresses along the apparatus, for example, from an inlet to an outlet when operating on a continuous basis.

U.S. Pat. No. 4,189,291 (Apparatus and Process for Recovering Scraps of Thermoplastic Material Even of Heterogeneous Shapes, by Gradual Melting and Compression Through One or More Orifices) discloses a rotating, non-perforated, heated cylinder eccentrically located within a stationary heated cylindrical casing to form a single nip, for plasticizing or softening solid thermoplastic materials that are fed to it through a hopper. Thus, this patent does not disclose an apparatus involving a rotary perforated drum or cylinder that forms at least two nip zones within the housing.

The present invention is directed to an improved method and apparatus which employs a rotating perforated drum in a novel arrangement in order to mix or otherwise process liquids with greater efficiencies of both time and energy. Such an improvement is frequently desirable for carrying out many industrial and chemical processes.

SUMMARY OF THE INVENTION

The instant invention consists of an apparatus for increasing fluid surfaces, for example, for mixing one or more liquid materials, for removing volatile substances from a liquid, and/or for enhancing the reaction of a liquid mixture. The apparatus comprises:

(a) a housing having at least one inlet whereby unprocessed or unreacted liquid is fed into the apparatus;

(b) a rotating perforated drum located within the housing;

(c) exterior to the rotating perforated drum and in cooperation therewith, an outside relatively stationary body capable of tangential contact with the curved outer surface of the rotating perforated drum, which tangential contact is elongated in the axial direction of the rotating perforated drum, thereby forming, outside the rotating perforated drum and in proximity to said tangential contact, at least one outer nip region between the curved outer surface of the rotating perforated drum and the inward surface of the outside relatively stationary body, which outer nip region converges, when viewed in radial cross-section with respect to the rotating perforated drum, to a point of tangential contact, whereby liquid material accumulating within the outer nip region is forced, through perforations, into the inside of the rotating perforated drum, thereby forming a liquid film on that inside surface of the drum which is opposite to that outside surface of the drum adjacent the outer nip zone;

(d) interior to the rotating perforated drum, an inner relatively stationary body positioned within the rotating perforated drum, a convexly curved outer surface of the inner relatively stationary means capable of tangential contact with the concavely curved inner surface of the rotating perforated drum, which tangential contact is elongated in the axial direction of the rotating perforated drum, thereby forming, inside the rotating perforated drum and in proximity to said tangential contact, at least one inner nip region between the curved outer surface of the inner relatively stationary body and the curved inner surface of the rotating perforated drum, which inner nip region converges, when viewed in radial cross-section with respect to the rotating perforated drum, to a point of tangential contact, whereby liquid material accumulating within the inner nip region is forced though said perforations and out of the rotating perforated drum, thereby forming a liquid film on an outside surface of the drum which is opposite to the inside drum surface adjacent the inner nip zone;

whereby the points of tangential contact, in cross-section with respect to the rotating perforated drum, and therefore also the inner and outer nip regions formed thereby, are spaced along the circumference of the rotary perforated drum, and the liquid material being processed, until being withdrawn from the apparatus, can repeatedly move between the outer nip region and the inner nip region, such that the nip regions or zones cause agitation of the fluid being processed and repeatedly generate new fluid surfaces.

Optionally, the apparatus may further comprise one or more ports, in communication with the space between the rotating perforated drum and the housing, for the removal of volatile constituents. For continuous operation, the apparatus may include an exit port for the removal of product such that the liquid material being processed, until being withdrawn from the apparatus, can repeatedly move between at least one outer nip region and at least one inner nip region as the material being processed progresses in the axial direction of the rotating perforated drum from the inlet port to the exit port.

In one embodiment of the above apparatus, the housing may be substantially cylindrical, although square, ovoid, rectangular, or other shapes may be employed, as will be readily appreciated by the skilled artisan.

The above apparatus may have additional ports in the housing for permitting an inert or otherwise nonreactive gas under pressure, such as nitrogen, to enter the housing so as to sweep volatile constituents or volatile by-products away from the surface of the fluid. Alternatively, depending on the chemical or industrial process involved, it may be desirable to introduce a gaseous reactant for absorption and/or reaction in a liquid material.

The present apparatus may be used as a reactor for reacting a first fluid reactant with a second fluid reactant, wherein a first fluid reactant is fed into the housing through the inlet port and the second fluid reactant is fed through the same or a different port, optionally under pressure in the case of a gaseous reactant. The invention is particularly advantageous for diffusion-limited reactions, including polymerization processes. The present invention, by speeding up reactions requiring high temperatures, may, in some cases, serve to eliminate or decrease undesirable product degradation or by-products. Thus, a superior product may be obtained using the present invention in some chemical processes.

The present apparatus and process can be used to subject unprocessed or unreacted fluids to a high surface renewal rate so as to enhance mixing, polymerization, reaction, or finishing. Unprocessed fluids may include, for example, a polymer from which unreacted monomers and/or oligomers need to be extracted. In certain cases, it is desirable that polymers of low molecular weight are more completely converted to high molecular weight polymers.

The apparatus of this invention may have a single or multiple feeds, including combinations of liquid(s) and/or gas(es), which may enter the apparatus by a single or multiple inlets. In some processes, solid materials, such as catalysts or particles being treated, may be dispersed within a liquid, for example, to form a slurry.

The apparatus may have single or multiple ports for the extraction of volatile materials that are present in a liquid being processed. Such volatile materials may be extracted through one or more ports assisted by a vacuum, a partial vacuum, or by sweeping the apparatus with a gaseous fluid.

As indicated above, therefore, the present apparatus has wide and various applicability, including extracting, mixing, reacting, polymerizing, finishing, or some combination of such processes. In general, the apparatus is useful for any process which benefits from subjecting one or more fluids to a high rate of surface renewal.

The accompanying drawings, which are incorporated in and constitute a part of the specification, illustrate presently preferred embodiments of the invention and, together with the general description given above and the detailed description given below, serve to explain the principles of the invention. The drawings illustrate several embodiments contemplated for carrying out this invention; other embodiments are also contemplated.

DETAILED DESCRIPTION OF THE INVENTION

As indicated above, the present invention consists of an apparatus and process for increasing fluid surfaces, for example, for mixing, separating, and/or reacting one or more fluid materials. The apparatus comprises a housing having at least one inlet whereby unprocessed or unreacted liquid is fed into the apparatus and a rotating perforated drum located within the housing. Exterior to the rotating perforated drum and in cooperation therewith, is an outside relatively stationary body capable of tangential contact with the curved outer surface of the rotating perforated drum to form at least one outer nip region between the curved outer surface of the rotating perforated drum and the inward surface of the outside relatively stationary body. Interior to the rotating perforated drum, an inner relatively stationary body comprises a convexly curved outer surface capable of tangential contact with the concavely curved inner surface of the rotating perforated drum, thereby forming, inside the rotating perforated drum at least one inner nip region between the inner relatively stationary body and the rotating perforated drum. The inner and outer nip regions are spaced along the circumference of the rotary perforated drum, and the liquid material being processed, until being withdrawn from the apparatus, can repeatedly move between the outer nip region and the inner nip region, such that the nip regions or zones cause agitation of the fluid being processed and repeatedly generate new fluid surfaces.

Figure 1:
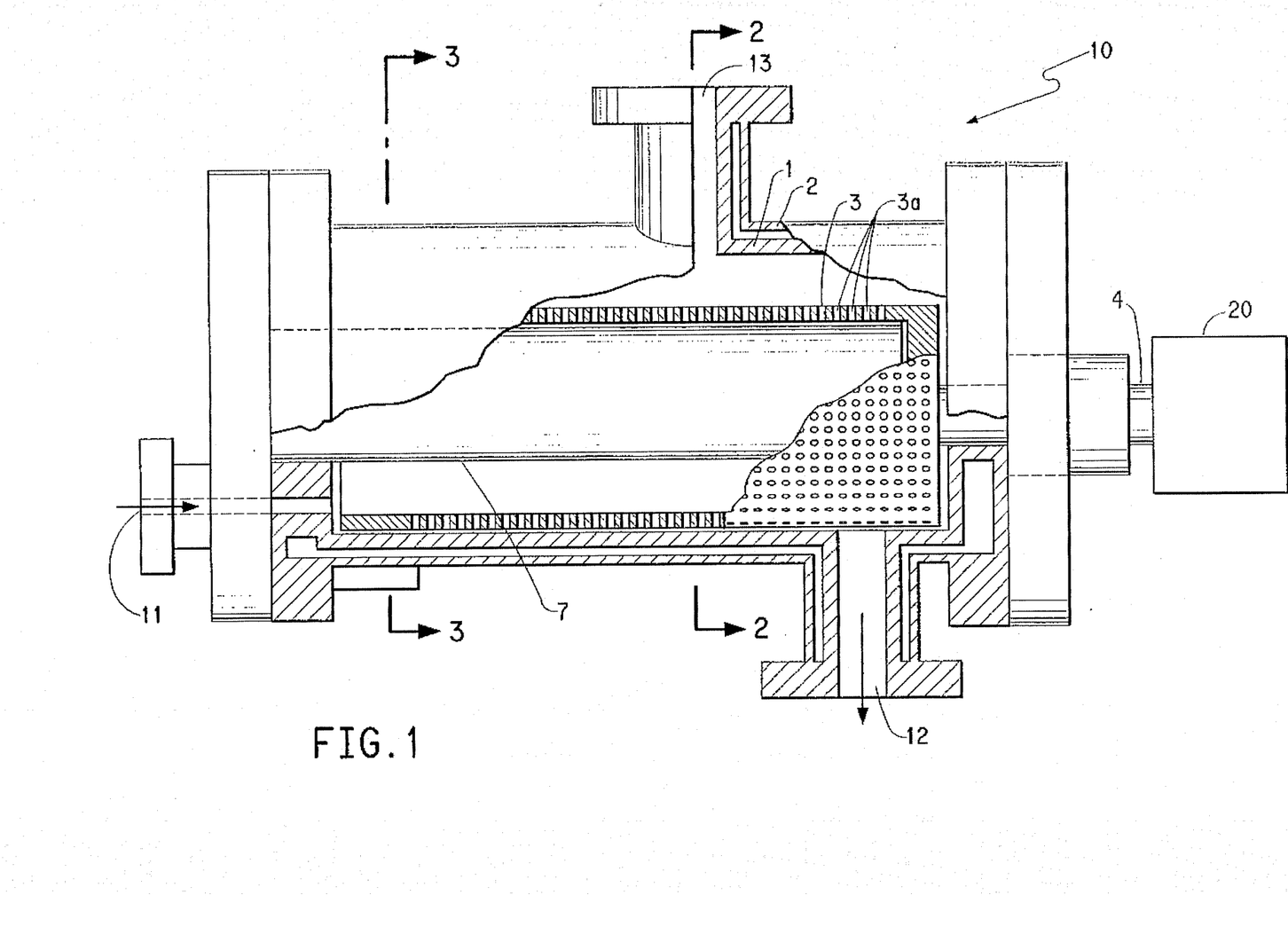
FIG. 1 is a side partially sectional view of an exemplary embodiment of the invention which can be used, according to the present invention, as a continuous processor, polymerizer, or finisher.

Referring now to FIG. 1, number 10 generally denotes a processing apparatus, which may be employed as a mixer, liquid-gas separator, reactor, polymerizer, finisher, or the like, in accordance with one embodiment of the present invention. The apparatus, as illustrated, is configured so as to be operated in a continuous mode, but the apparatus could also be constructed, retaining key features, to operate in a batch mode.

Apparatus 10 comprises a generally cylindrical housing 1 which, as illustrated, includes a heating jacket 2. Other shapes for the housing are possible, as, for example, described below. Eccentrically positioned within the housing is a rotating drum 3 containing a plurality of perforations 3a and mounted on a drive shaft 4 connected to a drive means 20. In other embodiments, however, as exemplified below, the rotating drum is not eccentrically positioned in the housing.

Figure 2:
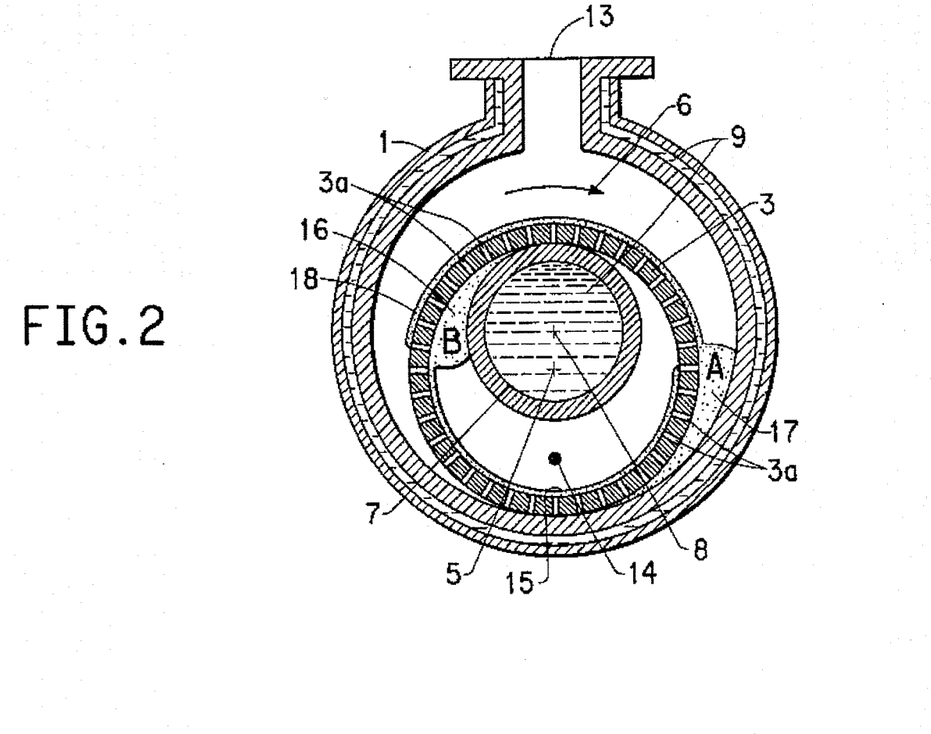
FIG. 2 is a sectional view of the apparatus illustrated in FIG. 1 taken along the line 2—2 showing a liquid being processed.

Referring now to FIG. 2, the axis of rotation for the rotating drum is shown at 5 and the direction of rotation is shown by arrow 6. Positioned within the rotating perforated drum is a non-rotating stator drum 7, the center 8 of which coincides with the center of the cylindrical housing. The surface of the non-rotating stator drum is preferably smooth, although shallow indentations, profilings, or grooves are possible to enhance mixing or affect the movement of the fluid being processed. The outer rotating perforated drum 3, in this embodiment, is mounted eccentrically relative to the inner non-rotating stator drum 7, as evidenced by the different axis of rotations 5 and 8, respectively. The inner surface of the rotating perforated drum is tangent to the outer surface of the stator drum.

The outer surface of the perforated drum, in turn, is tangent to the inner surface of the cylindrical housing 1. The stator drum 7 may be heated, as shown in FIG. 2, by an internal heating media 9, such as hot oil.

Returning now to FIG. 1, the apparatus 10 has an inlet 11 where fluid material to be processed is fed to the apparatus and an outlet 12 where fluid material which has been processed may exit the apparatus. The apparatus 10 is further equipped with a port 13 through which any volatile constituents removed from the fluid material may exit the apparatus 10. To assist in the removal of any volatile materials, a vacuum may be applied to the port. Alternatively, a gas under pressure, such as nitrogen, may be added to the system through a second port (not shown) to sweep the volatile materials away from the surface of the fluid being processed in order to allow these materials to exit through the port 13.

In operation, as illustrated in FIGS. 1 and 2, fluid material from inlet 11 enters the processor in the space between the inner surface of the perforated drum 3 and the outer surface of the stator drum 7, the entrance point denoted as 14 in FIG. 2. Alternative or additional entrance points, however, are also contemplated herein.

Referring to FIG. 2, the fluid material within the processor, due to viscous drag, is carried as a film 15 on the inner surface of the rotating drum into a kind of liquid wedge "B", a first (or inner) nip zone or region, which is formed where the concavely curved inner rotating surface approaches the convexly curved surface of the stator drum. The fluid material 16 in the first nip zone is thereby squeezed between the outer surface of the stator drum 7 and the inner surface of the rotating perforated drum 3. Hydrodynamic forces drive the fluid through the rotating drum's perforations 3a, located near wedge "B", to the outside of the rotating drum 3, thereby forming a film or layer 18 on the outer surface of the rotating perforated drum. Viscous drag again carries the fluid material in film 18 on the outer surface of the rotating perforated drum, this time into a kind of fluid wedge "A", a second or outer nip zone or region. The fluid material 17 therein is now squeezed between the outer surface of the rotating perforating drum 3 and the inner curved surface of the cylindrical housing 1 which like the stator drum 7 is stationary. Hydrodynamic forces drive the fluid material through perforations 3a located near wedge "A" of the rotating drum, back into the rotating drum, thereby forming a film on the inner surface of the rotating drum.

As the processor continues to operate, any volatile materials can escape from the fluid material being processed. The forcing of a fluid material to and fro through the two nip zones generates large surface areas in the form of thin films on the surfaces of the drums within the apparatus.

Accordingly, the apparatus of this invention maintains a high fluid surface to volume ratio and regenerates the fluid surface frequently. When operating in continuous mode, processed fluid material can be conveyed towards outlet 12 by gravity or other means, as shown in FIG. 1. Any volatile constituents may exit through the port 13 assisted by vacuum or by gas pressure.

The apparatus can be operated in many different ways and adjusted within wide limits, depending on the particular application. For example, the speed of rotation of the driven parts can be adjusted such that the apparatus can be adapted, in an optimum manner, to the particular material being processed. Thus, the degree of mixing, reacting, etc., as well as the throughputs, can be varied as required.

Among its uses, the apparatus of this invention can be used to process any fluid material in need of devolatization. The apparatus is especially well suited for processing thermoplastic polymeric materials, for example polyesters such as polyethylene terephthalate and copolymers thereof. The apparatus can also be used as a finisher in a melt polymerization process in order to raise, in a limited period of time, the degree of polymerization of the melt, merely as an example, from an IV (intrinsic viscosity) of 0.3 to an IV of 0.8.

A processor according to this invention can also be used as a reactor for many chemical processes, wherein a first fluid reactant is fed through inlet 11 and a second fluid reactant is fed through port 13 or through an additional port (not shown), optionally under pressure in the case of a gaseous reactant. The present invention, by generating an increased surface area for the contacting of reactants, aids in furthering their chemical reaction.

Figure 3:
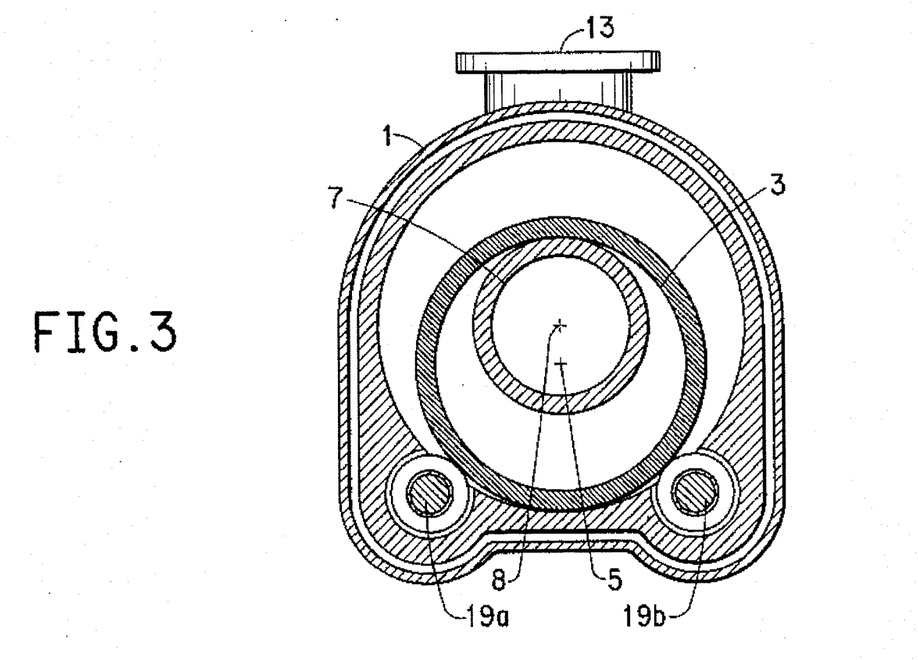
FIG. 3 is a sectional view of the apparatus illustrated in FIG. 1 along the sectional line 3—3 showing one possible means of supporting the rotating drum in the embodiment of FIG. 1.

FIG. 3 illustrates one means of supporting an apparatus, for continuous operation, of indeterminate length. Illustrated are a pair of support rollers 19a, 19b, positioned within the bottom of cylindrical housing 1, juxtaposed to rotating drum 3 to provide support for a drum of some considerable length.

A number of other configurations for supporting and/or driving the apparatus can be employed in keeping with the present invention, as may be appreciated by the skilled artisan. For example, one or more circular support plates may be intermediately placed along the length of the processor, perpendicularly and surrounding, by means of a bearing, the drive shaft, with a slot near the periphery of the support plate, for the passage of the fluid material being processed.

None of various support mechanisms mentioned above, however, should be considered as limiting the scope of the present invention, as any such support that allows for a suitable length for processing purposes may be considered to be within the scope of this invention.

Figure 4:
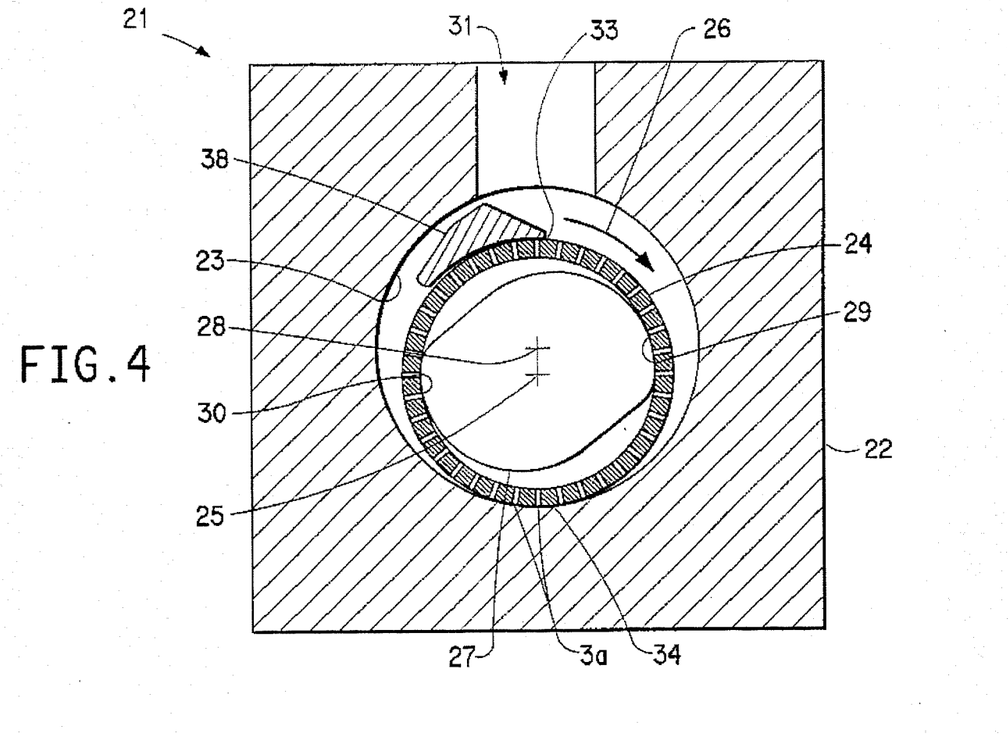
FIG. 4 is a cross-sectional view of another exemplary embodiment of the invention which can be used for carrying out the various processes mentioned herein.

FIG. 4 shows another embodiment of the present invention. Apparatus 21 comprises a housing 22 which, as illustrated, has a square outside shape and a cylindrical interior surface 23. Eccentrically positioned within the housing is a rotating drum 24 containing a plurality of perforations 3a and mounted on a drive shaft (not shown).

The axis of rotation for the rotating drum is shown at 25, and the direction of rotation is shown by arrow 26. Positioned within the rotating perforated drum is a non-rotating stator body 27, the center of which coincides with the center of the rotary perforated drum, which is below the center of the cylindrical inner surface of the housing as shown at 28. The non-rotating stator drum is preferably smooth, and has the shape, in cross-section, of an asymmetrically flattened cylinder as shown in the figure.

The inner surface of the rotating perforated drum 24 is tangent to the outer surface of the stator body 27 in two places, 29 and 30, approximately equally spaced along the circumference of the rotating perforated drum such that the nips are arcuately spaced apart and adjacent the rotating perforated drum.

The outer surface of the rotating perforated drum, in turn, is tangent to an outer stator body 38, which is situated within the inner surface of the housing 22. The outer stator body may be elongated along a substantial length of the rotating perforated drum or may be divided up into a plurality of sections.

The apparatus 21 has an inlet 31 where fluid material to be processed may be fed to the apparatus and, for continuous operation, and an outlet (not shown) where fluid material which has been processed may exit the apparatus.

In operation, as illustrated in FIG. 4, apparatus 21 may function analogously to apparatus 10 in FIGS. 1–2, except that two internal nip regions near 29 and 30 are formed and two external nip regions near 33 and 34 are formed (that is, external or internal to the rotating perforated drum). The fluid material from inlet 31 enters the apparatus and, due to viscous drag, the fluid material is carried as a film on the inner surface of the rotating drum into each of two (inner) nip zones or regions leading to the tangencies near 29 and 30 The fluid material in these nip zones is squeezed between the outer surface of the stator body 27 and the inner surface of the rotating perforated drum 24. Hydrodynamic forces drive the fluid through the perforations near each nip region and thereby outside of the rotating drum 24, including the formation of a film on the outside surface of the rotating drum. Viscous drag again carries the fluid material as a film on the outer surface of the rotating perforated drum into the two (outer) nip zones or regions near the tangencies 34 and 33. Near point 34, the fluid material is now squeezed between the outer surface of the rotating perforating drum 34 and the inner curved surface of the cylindrical housing 23. Near point 33, the fluid material is squeezed between the outer surface of the rotating perforating drum 34 and the inner curved surface of the stator body 30. Hydrodynamic forces drive the fluid material back through perforations 3a, located near each outer nip zone and back into the rotating drum, including the inner surface of the rotation drum. Thus, the liquid material being processed, until being withdrawn from the apparatus, can repeatedly move, back and forth or to and fro, between an outer nip region and an inner nip region. In a continuous operation, the liquid material being processed also progresses in the axial direction of the rotating perforated drum.

Figure 5:
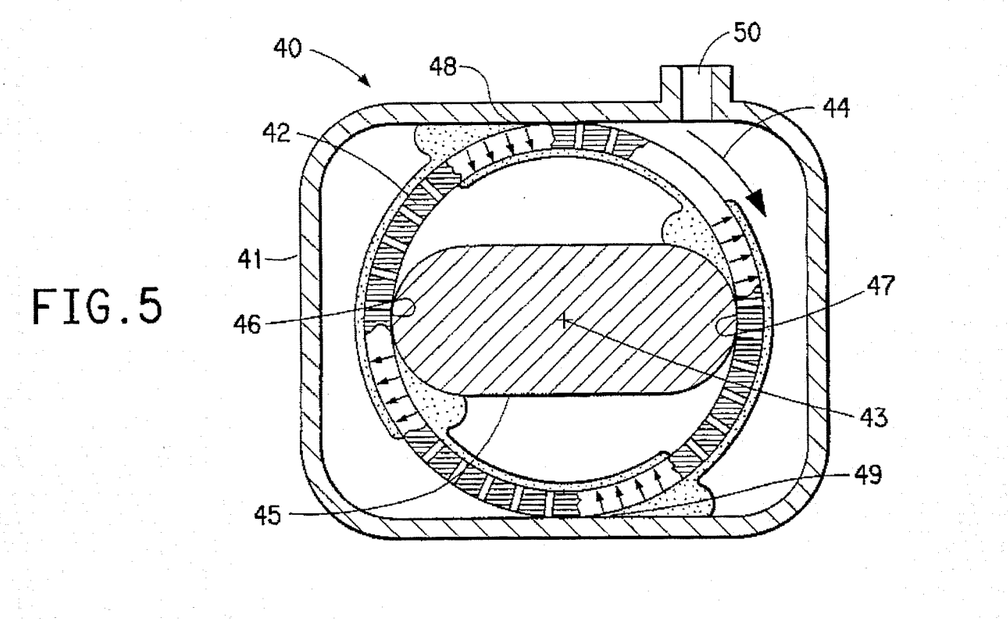
FIG. 5 is a cross-sectional view of yet another exemplary embodiment of the invention which may used, for example, for polymerization processes.

FIG. 5 shows yet another embodiment of the present invention. Apparatus 40 comprises a housing 41 which, as illustrated, has a generally rectangular shape. Centrally positioned within the housing is a rotating drum 42 containing a plurality of perforations and mounted on drive shaft (not shown).

The axis of rotation for the rotating drum is shown at 43 and the direction of rotation is shown by arrow 44. Positioned within the rotating perforated drum is a non-rotating stator body 45, the center of which coincides with the center of the rotary perforated drum 42. The non-rotating stator drum has the shape, in cross-section, of a flattened cylinder, as shown in the figure, which forms two convex surfaces in tangential cooperation with the inside concave surface of the rotating perforated drum. In particular, the inner surface of the rotating perforated drum is tangent to the outer surface of the stator body 27 in two places 46 and 47, approximately equally spaced along the circumference of the rotating perforated drum.

The outer convexly curved surface of the rotating perforated drum, in turn, is in tangential relationship to the inside concavely curved surface of the housing at two locations 48 and 49.

The apparatus 40 has an inlet 50 where fluid material to be processed may be fed to the apparatus and, for continuous operation, an outlet (not shown) where fluid material which has been processed may exit the apparatus.

In operation, as illustrated in FIG. 5, apparatus 40 may function analogously to apparatus 21 in FIG. 4, wherein two internal nip regions near 46 and 47 are formed and two external nip regions near 48 and 49 are formed. The fluid material from inlet 50 enters the apparatus and, due to viscous drag, is carried as a film on the inner surface of the rotating drum into each of two (inner) nip zones or regions leading to the tangencies near 46 and 47. The fluid material in these nip zones is squeezed between the outer surface of the stator body 45 and the inner surface of the rotating perforated drum 42. Hydrodynamic forces drive the fluid through the perforations near each nip region and thereby outside of the rotating drum 42, including the outside surface of the rotating drum. Viscous drag again carries the fluid material as a film on the outer surface of the rotating perforated drum into two (outer) nip zones or regions near to, and leading to, the tangencies 48 and 49. Near these points, the fluid material is squeezed between the outer surface of the rotating perforating drum 42 and the inner curved surface of the housing 41. Hydrodynamic forces drive the fluid material back through the rotating drum's perforations, located near each outer nip zone, and back into the rotating drum, including the inner surface of the rotation drum.

Yet further embodiments of the present invention may be envisioned by the skilled artisan. For example, it might be envisioned that the stator body 45 in FIG. 5, may comprise three or four separately convexly curved surfaces or protruberances, for example, by employing an inner stator, triangular in cross-section, with curved tips or corners. The triangular corners may be tangential to the inner surface of the rotating perforated drum and might form, respectively, three inner nip zones.

The invention may be is clarified by the following Example, which is intended to be purely exemplary of one preferred embodiment of the invention.

EXAMPLE 1

This example illustrates the processing of a prepolymer, namely a low molecular weight oligomeric precursor of polyethylene terephthalate, which is finished in the apparatus of the instant invention. By "finishing" herein is meant the raising of the degree of polymerization of a prepolymer material.

A prepolymer feed material was formed by the esterification of terephthalic acid and ethylene glycol followed by a polycondensation reaction facilitated by the catalyst antimony trioxide ($Sb_2O_3$). The prepolymer had an intrinsic viscosity of 0.285 dl/gm, a degree of polymerization of 25.33, a carboxyl ends content of 27.1 $Eq/10^6$ gms, an antimony content of 241 to 245 ppm, and a diethylene glycol content of 1.07% to 1.10%.

For purposes of this example, the equipment illustrated was run in batch mode at 280° C. In lieu of a separate inlet channel, a feed hopper was placed at the port of an apparatus configured similarly to the apparatus shown in FIG. 2. The rotating perforated drum had an outer diameter of 3.792 inches, an inner diameter of 3.077 inches, 8 rows of holes with 48 holes per row, for a total number of holes of 384. Each hole or perforation is 0.062 (1/16th) inches in diameter. The stator has a diameter of 2.312 inches and the distance between the axial centers of the stator body and the rotating drum is 0.375 inches.

The granular feed material was dried overnight at 120° C. in a vacuum. With the rotor drum stopped, a portion of a 42 gram charge of feed material was added through the hopper to the processor, under nitrogen at atmospheric pressure. The feed material introduced into the processor was given time to melt. The rotor was then run at 20 rpm for a short time to confirm, based on the torque read-out, that the feed material was melted. The rotor was then stopped, another portion of the 42 g charge of feed material was added and given time to melt, the rotor again run at 20 ppm, etc., until the full charge of feed material was in the reactor and melted. A vacuum of approximately 0.5 mm Hg (absolute) was then applied to the processor. The rotor speed was then set at 30 RPM. The processor was allowed to run for 20 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity (IV) of the product was determined to be 0.415 dl/gm corresponding to a degree of polymerization of 43.61 units.

EXAMPLE 2

This example provides a further illustration of the processing of a low molecular weight oligomeric precursor of polyethylene terephthalate, which is finished in the apparatus of the instant invention.

A prepolymer feed material was formed as described in Example 1, with the same IV and initial DP. The equipment was run in batch mode at 290° C. In lieu of a separate inlet channel, a feed hopper was placed at the port of an apparatus configured similarly to the apparatus shown in FIG. 2. The rotating perforated drum had an outer diameter of 3.792 inches, an inner diameter of 3.077 inches, 8 rows of holes with 48 holes per row, for a total number of holes of 384. Each hole or perforation is 0.062 (1/16th) inches in diameter. The stator has a diameter of 2.312 inches and the distance between the axial centers of the stator body and the rotating drum is 0.375 inches.

The granular feed material was dried overnight at 120° C. in a vacuum. With the rotor drum stopped, a portion of a 55 gram charge of feed material was added through the hopper to the processor, under nitrogen at atmospheric pressure. The feed material introduced into the processor was given time to melt. The rotor was then run at 20 rpm for a short time to confirm, based on the torque read-out, that the feed material was melted. The rotor was then stopped, another portion of the 55 g charge of feed material was added and given time to melt, the rotor again run at 20 ppm, etc., until the full charge of feed material was in the reactor and melted. A nitrogen (sweep) was introduced at slightly above atmosphere pressure or slightly above 760 mm Hg absolute. The rotor speed was then set at 60 RPM. The processor was allowed to run for 30 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity of the product was determined to be 0.4966 dl/gm corresponding to a degree of polymerization of 56.53 units.

EXAMPLE 3

This example provides yet one further illustration of the processing of a low molecular weight oligomeric precursor of polyethylene terephthalate, which is finished in the apparatus of the instant invention.

A prepolymer feed material was formed as described in Example 1, with the same IV and initial DP. The equipment was run in batch mode at 290° C. In lieu of a separate inlet channel, a feed hopper was placed at the port of an apparatus configured similarly to the apparatus shown in FIG. 2. The rotating perforated drum had an outer diameter of 3.792 inches, an inner diameter of 3.077 inches, 8 rows of holes with 48 holes per row, for a total number of holes of 384. Each hole or perforation is 0.062 (1/16th) inches in diameter. The stator has a diameter of 2.312 inches and the distance between the axial centers of the stator body and the rotating drum is 0.375 inches.

The granular feed material was dried overnight at 120° C. in a vacuum. With the rotor drum stopped, a portion of a 55 gram charge of feed material was added through the hopper to the processor, under nitrogen at atmospheric pressure. The feed material introduced into the processor was given time to melt. The rotor was then run at 20 rpm for a short time to confirm, based on the torque read-out, that the feed material was melted. The rotor was then stopped, another portion of the 55 g charge of feed material was added and given time to melt, the rotor again run at 20 ppm, etc., until the full charge of feed material was in the reactor and melted. The pressure was then reduced to 1.3 mm Hg absolute and a nitrogen sweep was introduced by adjusting the nitrogen inlet valve until a pressure of 4 mm Hg was obtained. The rotor speed was then set at 60 RPM. The processor was allowed to run for 30 minutes, after which time water was circulated through cooling passages in the housing of the processor to quench the molten processed material. Products of condensation (e.g., glycol, diethylene glycol, and water) were collected in a cold trap connected to the evacuated processor.

Polymeric product was collected from the processor and analyzed. The product was white and appeared to be free of color impurities based on visual inspection. The intrinsic viscosity of the product was determined to be 0.8475 dl/gm corresponding to a degree of polymerization of 122.45 units. The use of nitrogen sweep under vaccuum was, therefore, found to significantly increase the polymerization rate in this example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for processing a liquid material, which apparatus comprises:

(a) a housing having at least one inlet whereby an unprocessed liquid is fed into the apparatus;

(b) a rotating drum, located within the housing, containing a plurality of perforations;

(c) exterior to the rotating drum and in cooperation therewith, an outside relatively stationary body capable of tangential contact with a convexly curved outer surface of the rotating drum, which tangential contact is elongated in the direction of the axis of the rotating drum, thereby forming, outside the rotating drum and in proximity to said tangential contact, at least one outer nip region between the convexly curved outer surface of the rotating drum and an inward surface of the outside relatively stationary body, which said at least one outer nip region converges, in radial cross-section of the rotating drum, as approaching surfaces of the rotating drum and the outside relatively stationary body reach the point of tangential contact, whereby liquid material accumulating within the said at least one outer nip region is forced through some of the perforations in the rotating drum into the inside of the rotating perforated drum, including the forming of a liquid film on that drum surface which is opposite to that drum surface adjacent the said at least one outer nip region;

(d) an inner relatively stationary body positioned within the rotating drum, a convexly curved outer surface of the inner relatively stationary body capable of tangential contact with the concavely curved inner surface of the rotating drum, which tangential contact is elongated in the direction of the axis of the rotating drum, thereby forming, inside the rotating drum and in proximity to said tangential contact, at least one inner nip region between the convexly curved outer surface of the inner relatively stationary body and a concavely curved inner surface of the rotating drum, which at least one inner nip region converges, in radial cross-section with respect to the rotating drum, as approaching surfaces of the rotating drum and the inner relatively stationary body reach the point of tangential contact, whereby liquid material accumulating within the at least one inner nip region is forced, though said perforations, out of the rotating drum, including the forming of a liquid film on that drum surface which is opposite to that drum surface adjacent the at least one inner nip region;

whereby the points of tangential contact, in cross-section with respect to the rotating drum, and therefore also the inner and outer nip regions formed thereby, are arcuately spaced along the circumference of the rotary drum, and whereby the liquid material being processed can repeatedly move, to and fro, between an outer nip region and an inner nip region, until being withdrawn from the apparatus.

2. The apparatus of claim 1, whereby, in cross-section with respect to the rotary drum, there are two outer nip regions formed by two points of tangential contact between the rotating drum and the outside relatively stationary body.

3. The apparatus of claim 1 or 2, whereby, in cross-section with respect to the rotary drum, there are a plurality of inner nip regions formed by two points of tangential contact between the rotating drum and the inner relatively stationary body.

4. The apparatus of claim 3, wherein the inner relatively stationary body is in the shape of an asymetrically flattened cylinder.

5. The apparatus of claim 1, wherein the outside relatively stationary body is the housing.

6. The apparatus of claim 1, further comprising at least one outlet in said housing, whereby processed fluid may continually enter and exit the apparatus.

7. The apparatus of claim 1, further comprising at least one port whereby gaseous substances may be removed from the apparatus, said at least one port being in communication with the space between the outer surface of the rotating drum and the inner surface of the housing.

8. The apparatus of claim 1, wherein the housing comprising a heating means.

9. The apparatus of claim 8, wherein the heating means is a heating jacket.

10. The apparatus of claim 1, wherein the center of the inner relatively stationary body coincides with the center of the housing.

11. The apparatus of claim 1, further comprising means for heating the inner relatively stationary body.

12. The apparatus of claim 1, further comprising at least two support rollers, positioned within the bottom of the housing, juxtaposed to the rotating drum for supporting the drum.

13. An apparatus for processing a liquid material, which apparatus comprises:

(a) a housing have at least one inlet whereby an unprocessed liquid is fed into the apparatus;

(b) a rotating drum, located within the housing, containing a plurality of perforations;

(c) exterior to the rotating drum and in cooperation therewith, an outside relatively stationary body capable of tangential contact with a convexly curved outer surface of the rotating drum, which tangential contact is elongated in the direction of the axis of the rotating drum, thereby forming, outside the rotating drum and in proximity to said tangential contact, two outer nip regions between the curved outer surface of the rotating drum and an inward surface of the outside relatively stationary body, which outer nip regions each converge, in radial cross-section with respect to the rotating drum, as the surfaces approach each other in a point of tangential contact, whereby liquid material accumulating within each outer nip region is forced through some of the perforations into the inside of the rotating drum, including the forming of a liquid film on the surface areas of the drum which are opposite to those drum surface areas adjacent to each said outer nip region;

(d) interior to the rotating drum, an inner relatively stationary body positioned within the rotating drum, a convexly curved outer surface of the inner relatively stationary body capable of tangential contact with a concavely curved inner surface of the rotating drum, which tangential contact is elongated in the direction of the axis of the rotating drum, thereby forming, inside the rotating drum and in proximity to said tangential contact, two inner nip regions between the convexly curved outer surface of the inner relatively stationary body and the concavely curved inner surface of the rotating drum, which inner nip regions each converge, in radial cross-section with respect to the rotating drum, to each point of tangential contact, whereby liquid material accumulating within each inner nip region is forced, though said perforations, out of the rotating drum, including forming a liquid film on the surface areas of the drum which are opposite to those drum surface areas adjacent to each said inner nip region;

whereby, in cross-section with respect to the rotating drum, the points of tangential contact and, therefore, also the inner and outer nip regions formed thereby, are arcuately spaced along the circumference of the rotary drum, and whereby the liquid material being processed can repeatedly move, to and fro, between the outer nip region and the inner nip region until being withdrawn from the apparatus, as the liquid material progresses in the direction of the axis of the rotating drum.

14. The apparatus of claim 13, wherein the inner stationary body is in the shape of an asymetrically flattened cylinder.

15. A process for reacting components of a liquid mixture, comprising:
- (a) introducing the components of the liquid mixture into a reactor comprising a housing inside of which is a rotating drum containing a plurality of perforations;
- (b) operating the rotating drum such that an outside relatively stationary body, exterior to the rotating drum and in cooperation therewith, makes tangential contact with a curved outer surface of the rotating drum, which tangential contact is elongated in the direction of the axis of the rotating drum, thereby forming, outside the rotating drum and in proximity to said tangential contact, at least one outer nip region between the curved outer surface of the rotating drum and an inward surface of the outside relatively stationary body, which at least one outer nip region converges, in radial cross-section of the rotating drum, to a point of tangential contact, thereby causing the liquid mixture which is spread over an outer surface area of the rotating drum to accumulate within the at least one outer nip region and forcing the liquid mixture, through some of the perforations in the rotating drum, into the inside of the rotating drum, including the forming of a liquid film on a surface area of the drum which is opposite to that drum surface area adjacent the at least one outer nip region;

and, furthermore, causing a curved outer surface of an inner relatively stationary body, positioned within the rotating drum, to make tangential contact with the curved inner surface of the rotating drum, which tangential contact is elongated in the direction of the axis of the rotating drum, thereby forming, inside the rotating drum and in proximity to said tangential contact, at least one inner nip region between the curved outer surface of the inner relatively stationary body and the curved inner surface of the rotating drum, which said at least one inner nip region converges, in radial cross-section with respect to the rotating drum, to a point of tangential contact, such that the liquid material on the inner surface of the rotating drum is moved towards, and accumulates within, the at least one inner nip region and is forced, though said perforations, out of the rotating drum, including the forming of a liquid film on that surface of the drum which is opposite to that drum surface adjacent the at least one inner nip region;

whereby, in cross-section with respect to the rotating drum, the at least one inner and outer nip regions formed thereby are arcuately spaced along the circumference of the rotary drum, such that the surface of the liquid material is thereby increased while simultaneously mixing the liquid material exposed to the surface of the rotary drum so that the liquid material is processed to add or remove vaporizable components; and

- (c) withdrawing, from the reactor, the reaction product which has thereby been produced.

16. The process of claim 15, wherein the components are reacted in a polymerization reaction such that a mixture of monomers and/or oligomers are reacted to produce a polymer product.

17. The process of claim 16, wherein the polymer product is a copolymer comprising the reaction product of at least one dicarboxylic acid and at least one diol.

18. The process of claim 15, wherein, in cross-section with respect to the rotary drum, two outer nip regions are formed by two points of tangential contact between the rotating drum and the outside relatively stationary body.

19. The process of claim 15 or 18, whereby, in cross-section with respect to the rotary drum, a plurality of inner nip regions are formed by two points of tangential contact between the rotating drum and the inner relatively stationary body.

20. The process of claim 19, wherein the inner stationary body is in the shape of an asymetrically flattened cylinder.

21. The process of claim 15, wherein the outside relatively stationary body is the housing of the reactor.

22. The process of claim 15, wherein the process is operated in a continuous mode, with components continually entering the reactor and the reaction product, and any by-product, continually exiting the reactor.

23. The process of claim 15, further comprising, the removal of gaseous or volatile substances from the reactor.

24. The process of claim 15, wherein at least one gaseous reactant is introduced into the reactor.

25. The process of claim 15, wherein at least one non-reactive gas is introduced into the reactor to sweep away gaseous by-products.

26. The process of claim 15, further comprising the introduction of a vacuum in the reactor.

27. The process of claim 15, further comprising the heating of the liquid mixture within the reactor.

28. A process for processing a liquid mixture, comprising:
- (a) introducing the components of the liquid mixture into a processor comprising a housing inside of which is a rotating drum containing a plurality of perforations;
- (b) operating the rotating drum such that an outside relatively stationary body, exterior to the rotating drum and in cooperation therewith, makes tangential contact with a convexly curved outer surface of the rotating drum, which tangential contact is elongated in the direction of the axis of the rotating drum, thereby forming, outside the rotating drum and in proximity to said tangential contact, at least one outer nip region between the convexly curved outer surface of the rotating drum and an inward surface of the outside relatively stationary body, which at least one outer nip region converges, in radial cross-section with respect to the rotating drum, to a point of tangential contact, thereby causing the liquid mixture spread over an outer surface of the rotating drum to accumulate within the at least one outer nip region and forcing the liquid mixture, through some of the perforations, into the inside of the rotating drum, including the forming of a liquid film on that surface of the drum which is opposite to that drum surface adjacent the at least one outer nip region;

and, furthermore, causing a convexly curved outer surface of an inner relatively stationary body, positioned within the rotating drum, to make tangential contact with a concavely curved inner surface of the rotating drum, which tangential contact is elongated in the direction of the axis of the rotating drum, thereby forming, inside the rotating drum and in proximity to said tangential contact, at least one inner nip region between the curved outer surface of the inner relatively stationary body and the curved inner surface of the rotating drum, which said at least one inner nip region converges, in radial cross-section with respect to the rotating drum, to a point of tangential contact, such that liquid material on the inside surface of the rotating drum is moved towards, and accumulates within, the at least one inner nip region and is forced, though said perforations, out of the rotating drum, including forming a liquid film on that surface of the drum which is opposite to that drum surface adjacent the at least one inner nip region;

whereby points of tangential contact, in cross-section with respect to the rotating drum, and therefore also the at least one inner and outer nip regions formed thereby, are arcuately spaced along the circumference of the rotary drum, such that the surface of the liquid material is increased while simultaneously mixing the liquid material exposed to the surface of the rotating drum so that the liquid material is processed by the passage of vaporizable or gaseous components; and (c) withdrawing, from the processor, the processed product which has thereby been made.

* * * * *